United States Patent
Fregly et al.

(10) Patent No.: US 11,580,962 B2
(45) Date of Patent: Feb. 14, 2023

(54) ALIAS-BASED ACCESS OF ENTITY INFORMATION OVER VOICE-ENABLED DIGITAL ASSISTANTS

(71) Applicant: VERISIGN, INC., Reston, VA (US)

(72) Inventors: Andrew Fregly, Reston, VA (US); Burton S. Kaliski, Jr., McLean, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 205 days.

(21) Appl. No.: 16/860,372

(22) Filed: Apr. 28, 2020

(65) Prior Publication Data
US 2020/0258507 A1    Aug. 13, 2020

Related U.S. Application Data

(63) Continuation of application No. 15/839,806, filed on Dec. 12, 2017, now Pat. No. 10,665,230.

(51) Int. Cl.
| | | |
|---|---|---|
| *G10L 15/18* | (2013.01) | |
| *G06F 3/16* | (2006.01) | |
| *G10L 15/193* | (2013.01) | |
| *G06F 16/955* | (2019.01) | |

(52) U.S. Cl.
CPC .......... *G10L 15/1822* (2013.01); *G06F 3/167* (2013.01); *G06F 16/955* (2019.01); *G10L 15/193* (2013.01)

(58) Field of Classification Search
CPC . G10L 15/1822; G10L 15/193; G06F 16/955; G06F 3/167
See application file for complete search history.

(56) References Cited

U.S. PATENT DOCUMENTS

| | | | |
|---|---|---|---|
| 6,195,707 B1 * | 2/2001 | Minh | G06F 16/9566 707/E17.115 |
| 7,228,277 B2 | 6/2007 | Nagashima | |
| 7,240,006 B1 | 7/2007 | Brocious et al. | |
| 7,251,604 B1 | 7/2007 | Thenthiruperai | |

(Continued)

OTHER PUBLICATIONS

Agile Salt, LLC, "Web Check", Alexa Skills Store, released Jan. 12, 2017, https://www.alexaskillstore.com/WebCheck/B01M4NX2TM, 2 pages.

(Continued)

*Primary Examiner* — Brian L Albertalli
(74) *Attorney, Agent, or Firm* — Baker Botts L.L.P.; Michael A. Sartori

(57) ABSTRACT

In one embodiment, a domain-name based framework implemented in a digital assistant ecosystem uses domain names as unique identifiers for request types, requesting entities, responders, and target entities embedded in a natural language request. Further, the framework enables interpreting natural language requests according to domain ontologies associated with different responders. A domain ontology operates as a keyword dictionary for a given responder and defines the keywords and corresponding allowable values to be used for request types and request parameters. The domain-name based framework thus enables the digital assistant to interact with any responder that supports a domain ontology to generate precise and complete responses to natural language based requests.

20 Claims, 5 Drawing Sheets

(56) References Cited

U.S. PATENT DOCUMENTS

| | | | |
|---|---|---|---|
| 7,313,525 B1 | 12/2007 | Packingham et al. | |
| 8,078,472 B2 | 12/2011 | Resch et al. | |
| 9,015,730 B1* | 4/2015 | Allen | G06F 9/54 |
| | | | 719/310 |
| 9,343,065 B2* | 5/2016 | Anand | G06F 16/955 |
| 10,366,690 B1* | 7/2019 | Sarikaya | G10L 25/54 |
| 11,004,446 B2* | 5/2021 | Finkelstein | H04R 3/005 |
| 2002/0174177 A1 | 11/2002 | Miesen et al. | |
| 2007/0088549 A1 | 4/2007 | Mowatt | |
| 2007/0130112 A1* | 6/2007 | Lin | G06F 16/41 |
| 2010/0299139 A1 | 11/2010 | Ferrucci et al. | |
| 2010/0324910 A1 | 12/2010 | Chambers et al. | |
| 2011/0119302 A1* | 5/2011 | Gorman | G06F 16/367 |
| | | | 707/E17.014 |
| 2014/0337032 A1 | 11/2014 | Aleksic et al. | |
| 2014/0365209 A1 | 12/2014 | Evermann | |
| 2015/0213085 A1* | 7/2015 | Brooks | G06F 16/951 |
| | | | 707/758 |
| 2017/0034109 A1* | 2/2017 | Kamdar | H04L 61/3025 |
| 2018/0336268 A1* | 11/2018 | Xu | G06F 40/295 |

OTHER PUBLICATIONS

Allemann, Andrew, "A threat to the importance of domain names", Domain Name Wire, Jan. 5, 2017, https://domainnamewire.com/2017/01/05/threat-importance-domain-names/, 18 pages.

Mrouttenberg, "Can an Alexa Home Card contain a link to our web based shopping cart, following account linking?" Amazon Developer Forums, Jun. 16, 2016. https://forums.developer.amazon.com/questions/29476/can-an-alexa-home-card-contain-a-link-to-our-web-b.html.

SimilarWeb, "SimilarWeb", Alexa Skills Store, released Dec. 20, 2016, https://www.alexaskillstore.com/SimilarWeb/801N1SY7JZ, 2 pages.

Joel Fries, "Domain Name Info", Alexa Skills Store, released Dec. 23, 2015, https://www.alexaskillstore.com/Domain-Name-Info/B019R06W5A, 2 pages.

* cited by examiner

ALIAS-BASED ACCESS OF ENTITY INFORMATION OVER VOICE-ENABLED DIGITAL ASSISTANTS

CROSS-REFERENCE TO RELATED APPLICATIONS

This application is a continuation of the U.S. patent application titled, "ALIAS-BASED ACCESS OF ENTITY INFORMATION OVER VOICE-ENABLED DIGITAL ASSISTANTS," filed on Dec. 12, 2017 and having Ser. No. 15/839,806, which is related to U.S. patent application titled, "DOMAIN-NAME BASED OPERATING ENVIRONMENT FOR DIGITAL ASSISTANTS AND RESPONDERS," having application Ser. No. 15/839,802, and filed on Dec. 12, 2017. The subject matter of the related application is hereby incorporated herein by reference.

BACKGROUND OF THE INVENTION

Field of the Invention

Embodiments of the present invention relate generally to digital assistants and, more specifically, to a domain-name based operating environment for digital assistants and responders.

Description of the Related Art

Bot assistants are interactive assistants providing a conversational interface that allows users to perform natural language interactions related to aspects of one or more entities. Current implementations of bot assistants are unable to precisely identify entities and/or the information being requested and/or the individual provider (i.e., responders) needed to fulfill a request. Further, responders do not have a standardized way to integrate with bot assistants that does not require specialized applications built on top of the bot assistant platform.

There are several specific deficiencies with current bot assistant implementations. For example, for the natural language inquiry, "What is the weather in Berlin," a bot assistant may always identify a given weather responder for fulfilling the request. A new weather responder would have to individually implement support for each bot assistant. Further, bot assistants are hardwired to match a given keyword, which may be the most semantically natural way to issue a given request, with a single responder. Thus, even if a new responder were to implement the required support, the responder may still not be targeted for requests including the most semantically appropriate keyword. A further consequence of such an architecture is that a user of the bot assistant carries the burden of remembering different keywords for different responders or request types.

Another deficiency is the lack of precision in identifying the entity about which information is being requested. For example, for the natural language inquiry "What is the weather in Berlin," bot assistants typically cannot infer whether the user is referring to Berlin, Md. or Berlin, Germany. The lack of precision in identifying which entity a user is referring to makes responses to those requests imprecise and, oftentimes, frustrating for the user.

Yet another deficiency is the inability of bot assistants to provide users with information about a target entity from multiple responders. For example, for the natural language inquiry, "What are the most popular places to visit in France," the most complete answer might require an aggregation from multiple travel-related responders. However, current implementations of bot assistants do not have a standardized way to gather relevant information from multiple responders when processing a given request. Consequently, the response provided to a user for a given request is often incomplete.

As the foregoing illustrates, what is needed in the art is an infrastructure for digital assistants to provide more precise and complete responses to natural language requests.

SUMMARY OF THE INVENTION

One embodiment of the present invention sets forth a method for processing natural language requests. The method includes the steps of identifying a request type and one or more entity identifiers associated with a first natural language request received at a digital assistant, identifying an ontology that includes a keyword associated with the request type, wherein the ontology identifies a syntax for accessing a set of responders over a network, generating one or more requests that encapsulate the first natural language request based on the one or more entity identifiers, the set of responders, and the syntax, and transmitting one or more requests to the set of responders.

Advantageously, the techniques herein enable a digital assistant to identify, with precision using unique identifiers, such as domain names, the entities to be targeted when processing a natural language request. Such precision allows for accurate and complete responses to be provided to the natural language request.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one skilled in the art that the present invention may be practiced without one or more of these specific details.

Operational Overview

A digital assistant request is a natural language input provided to a digital assistant so as to instigate an interaction with responders who can fulfill the request. A digital assistant interface accepts natural language inputs and in turn provides responses in a human consumable format. To provide precise and complete responses to the natural language request, a unique-name based framework is discussed in detail below. The unique-name based framework may use unique identifiers, e.g., domain names, for request types, requesting entities, responders, and target entities. Further, the framework enables interpreting natural language requests according to ontologies associated with different responders. An ontology operates to define the syntax for interacting with responders, defining the keywords that identify request types and the corresponding allowable values to be used for request parameters. Further, the ontology may operate to identify allowable values that can be returned in responses to requests. The unique-name based framework thus enables the digital assistant to interact with any responder that supports a ontology to generate precise and complete responses to natural language based requests.

System Overview

Figure 1:
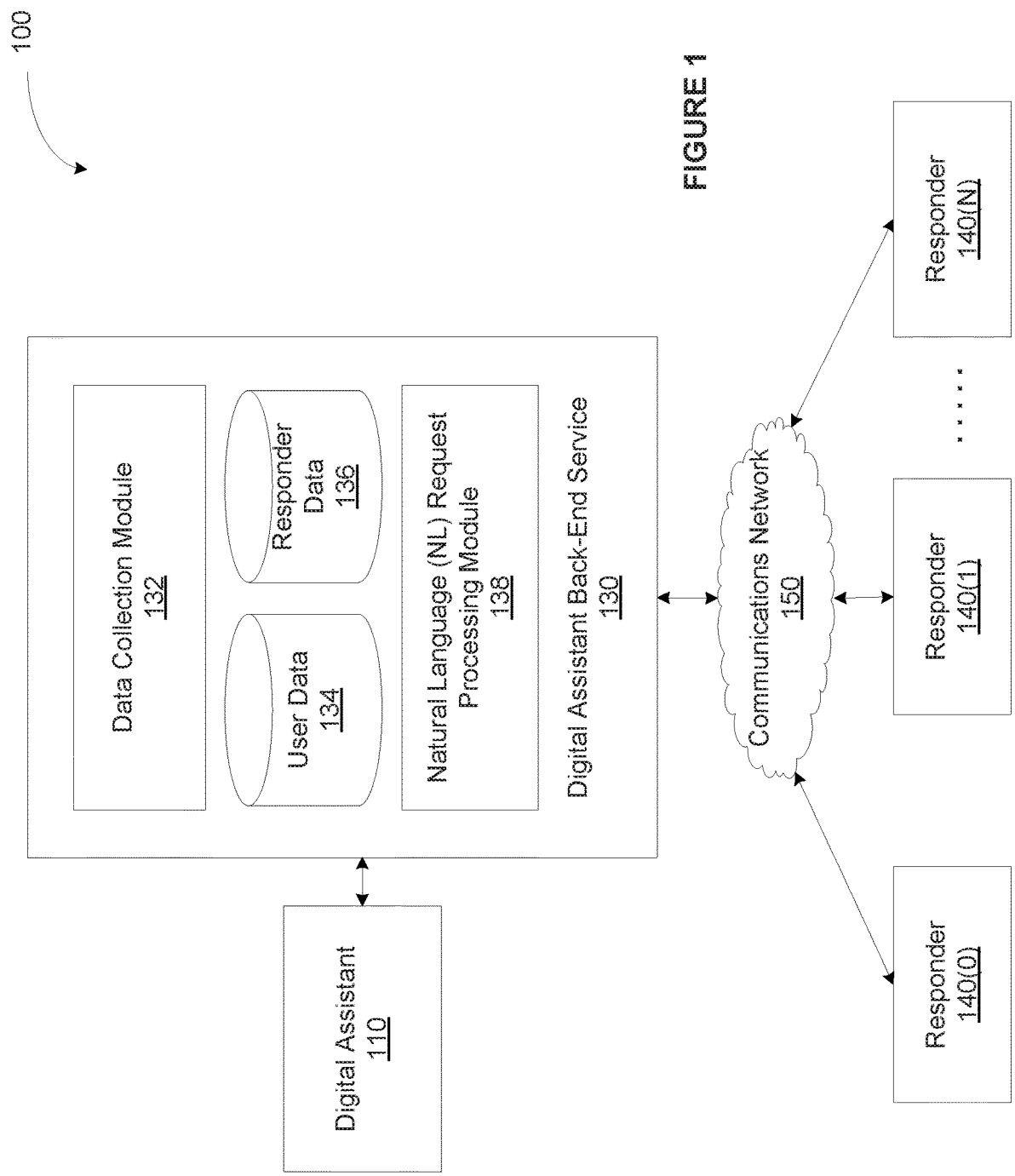
FIG. 1 illustrates a system configured to implement one or more aspects of the invention.

FIG. 1 illustrates a system 100 configured to implement one or more aspects of the invention. As shown, the system 100 includes, without limitation, a digital assistant 110, a digital assistant back-end service 130 (also referred to as the "back-end service 130"), responders 140(0)-140(N) (also referred to as "the responders 140," collectively, and "the responder 140," individually). In alternate embodiments, the system 100 may include any number of digital assistants 110, back-end services 130, and responders 140, in any combination.

A digital assistant 110 is an interactive digital assistant that exposes a conversational interface allowing users of the digital assistant 110 to perform natural language interactions. In one embodiment, a digital assistant may be a voice assistant that provides an audio user interface. In some embodiments, a digital assistant 110 may be implemented as a standalone device that is relatively simple in terms of functional capabilities with limited input/output components, memory, and processing capabilities. In some embodiments, the digital assistant 110 includes or is coupled to at least one microphone and includes or is coupled to at least one speaker in order to facilitate audio interactions with one or more users. In some embodiments, the digital assistant 110 is implemented without haptic input components (e.g., keyboard, keypad, touch screen, joystick, control buttons, etc.) or a display. In other embodiments, a limited set of one or more haptic input components may be included in the digital assistant 110 (e.g., a dedicated button to initiate a configuration, power on/off, etc.). The primary mode of user interaction with the digital assistant 110 as a voice assistant may be through voice input and audible output. In other embodiments, the digital assistant 110 may be a chatbot that provides a text based interface that allows a user to type input to the digital assistant 110 and the chatbot provides responses to the input in a textual display. Embodiments of digital assistants 110 as voice assistant are exemplary of processing capabilities that may be provided by other forms of digital assistants. Those with ordinary skill in the art are capable of applying the principles of the voice assistant embodiments to digital assistants that provide other user interface mechanisms, such as the text-based interface provided by a chatbot or a visual interface provided by a voice assistant that includes a touch-sensitive screen that serves as an input and output device.

In operation, the digital assistant 110 implemented as a voice assistant, via an audio input device, e.g., a microphone, captures audio from an environment in which the digital assistant 110 is placed. Such audio may include spoken words, music, ambient noise, etc. The digital assistant 110 and/or the other components in the system 100 (such as the back-end service 130) perform speech recognition on the captured audio to identify spoken words and interpret those spoken words into a user request. The requests may be for any type of operation. For example, the request may be for performing a specific action in the environment (e.g., "Turn living room lights off," and "Shuffle nursery rhymes") or may be targeted at an Internet-enabled service (e.g., "What is the weather in New York?," and "What were the major league baseball scores from last night?"). Other examples of such requests include consuming entertainment (e.g., gaming, finding and playing music, movies or other content, etc.), personal management (e.g., calendaring, note taking, etc.), online shopping, financial transactions, telephone communication, and so forth.

In an embodiment where the digital assistant 110 is a voice assistant, the digital assistant 110, via an audio output device, e.g., a speaker, may output a response confirming that the user request has been detected. In another embodiment where a digital assistant is a chatbot, the digital assistant may output a text response confirming that the user request has been detected. In addition, the digital assistant 110 may transmit user requests to the back-end service 130 to further process the request. The digital assistant 110 communicates with the back-end service 130 over a network (not shown) using wired technologies (e.g., wires, USB, fiber optic cable, etc.), wireless technologies (e.g., RF, cellular, satellite, Bluetooth, etc.), the Internet, or via other connection technologies.

In an embodiment where the digital assistant 110 is a voice assistant, the back-end service 130 processes audio captured by the digital assistant 110 to perform speech recognition operations in order to detect user requests and generate one or more responses or actions associated with the request. To generate the responses or actions, the back-end service 130 may interact with one or more responders 140 to process the user request. A responder 140 is a service, e.g., a networked service, that provides information or processing resources to its upstream clients, such as the user of the digital assistant 110. In some embodiments, a responder 140 is a service to be accessed over a local network or the Internet and that performs request-specific processing needed to fulfill a request. In some embodiments, target entities are specific entities that a responder 140 considers when fulfilling a request. A responder 140 may be a news platform, a gaming platform, or a records management service. Depending on the type of user request, the back-end service 130 may interact with several responders 140 to fulfill the user request and generate the associated responses. The back-end service 130 provides the responses to the digital assistant 110, which, in turn, outputs the responses via the speaker and/or performs the actions.

To perform the above functions, the back-end service 130 includes a data collection module 132, user data store 134, responder data store 136, and a natural language (NL) request processing module 138. The data collection module 132 collects information associated with users of the digital assistant 110 and stores the user information in the user data store 134. User information includes but is not limited to a user's identity, history of requests made by the user, history of responses provided to the user and any related subsequent requests, and configuration information provided by the user or automatically learned by the data collection module 132 over time. The data collection module 132 also collects information associated with the responders 140 and stores the responder information in the responder data store 136. Responder information includes but is not limited to the types of and details regarding the services and information that a responder 140 provides and mechanisms for connecting to and communicating with the responder 140. Further details regarding the data collection module 132 are provided in conjunction with FIG. 2 and the description thereof.

In an embodiment where the digital assistant 110 is a voice assistant, the NL request processing module 138 receives audio captured by the digital assistant 110 and performs speech recognition operations on the audio to identify a request spoken by the user. In an embodiment where the digital assistant 110 is a chatbot, the NL request processing module 138 receives textual input and may perform processing functions to normalize the request such as correcting misspellings. The NL request processing module 138 determines one or more parameters associated with the request such as the request type, the identity of the user who spoke the request, services and/or responders identified in the request, and a type of action to be performed. The NL request processing module 138 determines the parameters based on user information stored in the user data store 134 and responder information stored in the responder data store 136. In particular, the NL request processing module 138 identifies, based on the determined parameters, one or more responders 140 to which the user request is to be targeted (referred to as the "relevant responders 140") and the data to be provided to the relevant responders 140 in order to fulfill the request. The NL request processing module 138 generates a responder request based on the data to be provided to the relevant responders 140. The responder request may be formatted as a uniform resource identifier (URI) or some other format applicable to the communication protocol appropriate for interacting with a responder.

Each relevant responder 140 may provide to the NL request processing module 138 a response to the responder request. The NL request processing module 138 may transmit the responses to the digital assistant 110 or may process the responses to generate a formatted response. The formatted response may be an aggregated response including responses from multiple targeted responders or may be organized in a manner that enables a user of the digital assistant to navigate the formatted response. For example, in an embodiment where the digital assistant 110 is a voice assistant, audio output may be created that can be interactively spoken to a user one item at time with a pause between items to provide an opportunity for user input. Further details regarding the NL request processing module 138 are provided in conjunction with FIG. 4 and the description thereof.

In one embodiment, the digital assistant 110 locally performs some or all of the functions performed by the back-end service 130. In such an embodiment, the digital assistant 110 may collect and locally store user and responder configuration information. Further, the digital assistant 110 may perform speech recognition operations on audio to identify requests spoken by users and process those requests in conjunction with the responders 140 without the back-end service 130 operating as an intermediary.

The network 150 includes a plurality of network communications systems, such as routers and switches, configured to facilitate data communication between the back-end service 130 and the responders 140. Persons skilled in the art will recognize that many technically feasible techniques exist for building the communications network 150, including technologies practiced in deploying the well-known Internet communications network.

Unique Name Based Framework for Interpreting and Processing Natural Language Requests To interpret and process a natural language request with precision, the digital assistant 110 in conjunction with the back-end service 130 may need to extract from the request or otherwise infer one or more parameters associated with the request. The parameters may include, but are not limited to, (i) the identity of the user who provided the request, (ii) the identity of the device owner, (iii) a type of the request, e.g., information retrieval or performing an action external or internal to an environment in which the digital assistant 110 is placed, (iv) the identities of one or more responders 140 to be interacted with to fulfill the request, (v) the identities of one or more target entities and aspects of those target entities to which the request applies, and (vi) how to programmatically handle the request. For instance, "Ted Somebody" may issue the following request to a digital assistant 110, "ask Funky Stocks about Lunar Vacations Inc. stock price." In this request, the type of request is "ask," the identity of the device owner is "Ted Somebody," the responder is "Funky Stocks." Further, the target entity is "Lunar Vacations Inc.," and the specific aspect of the target entity is "stock price." How to handle the request may be identified as "find latest stock price" based on a default processing function defined for "stock price" and the user not specifying a processing option.

The parameters associated with a natural language request may be included in the request or may be semantically or structurally inferred by the back-end service 130. The unique name based framework implemented by the back-end service 130 allows for these parameters to be semantically determined based on specific identifiers, i.e., domain names or some other unique identifier, that may be included in or may be mapped to keywords included in the natural language request. A unique name based framework is exemplary of how the use of unique identifiers operates as an interoperable mechanism for interpreting natural language requests, where the responders plug into the framework by providing processing capabilities defined by ontologies that map keywords and/or request parameters to unique names. In one embodiment, the unique name-based framework could be based on domain names and sub-domain names as the unique identifiers. In this case, the unique name based framework is referred to as a domain name based framework. Many of the embodiments of a unique name based framework found here-in are based on a domain name based framework. Those with ordinary skill in the art are capable of applying the principles of the domain name based frameworks to other forms of unique name frameworks based on other types of unique names, such a Handle identifiers as defined in IETF RFC 3650, IETF RFC 3651 and IETF RFC 3652.

In an embodiment of using unique identifiers as entity identifiers, domain names are unique identifiers providing advantages versus other forms of unique identifiers that could be used to provide precision in identifying requesting entities (e.g., users of the digital assistant 110), responders 140, and target entities. First, domain names support explicit correspondence between unique names and unique entities such as requesting entities, responders 140, and target entities. For example, the domain name "dunkmeister-berlin.tld" could identify a donut shop in Berlin, Germany with the name "dunkmeister" and the domain name "bigleague-dunkmeister.tld" could identify a basketball player with the nickname "dunkmeister". Second, the Internet and the domain name system provide a global registration and resolution infrastructure to support using domain names as entity identifiers. Third, domain names are an inexpensive way for requesting entities, responders 140, and target entities to have globally unique identifiers. For example, domain names are already in place for many potential responders 140 that are accessed over the Internet so no or little additional cost or resources are expended in setting up domain names as unique identifiers. Fourth, a domain name can identify an Internet accessible server providing services that can be interacted with, for example as a responder or to provide services related to a specific entity.

In some embodiments, entity identifiers may be handle identifiers that are supported by a Handle Registry system as defined in IETF RFC 3650, IETF RFC 3651, and IETF RFC 3652. In an example of using Handle Identifiers, the handle identifier "999.9999/restaurants/Germany/Berlin/dunkmeister" could identify a donut shop in Berlin, Germany with the name "dunkmeister" and the domain name "999.9999/basketball/players/bigleague-dunkmeister" could identify a basketball player with the nickname "bigleague-dunkmeister". In some embodiments, unique entity identifiers may be derived from identifiers found in a parent name space. For example, a parent identifier name space may be defined as the set of all domain names and unique keywords within a domain name provide a new name space based on the domain name space. In another example, a namespace might be derived based on user names within a social media site to derive globally unique identifiers that have an identifier for the social media site as the parent name space. For example, if a social media social site is referred to with the unique identifier "socialbiz" within the universe of social media sites and has user "someperson," then the unique identifier "socialbiz:someperson" may be a unique global identifier for the user.

A domain name based framework or other unique name based framework has two main components: Data Collection implemented by the data collection module 132 and Request Processing implemented by the NL request processing module 138.

Figure 2:
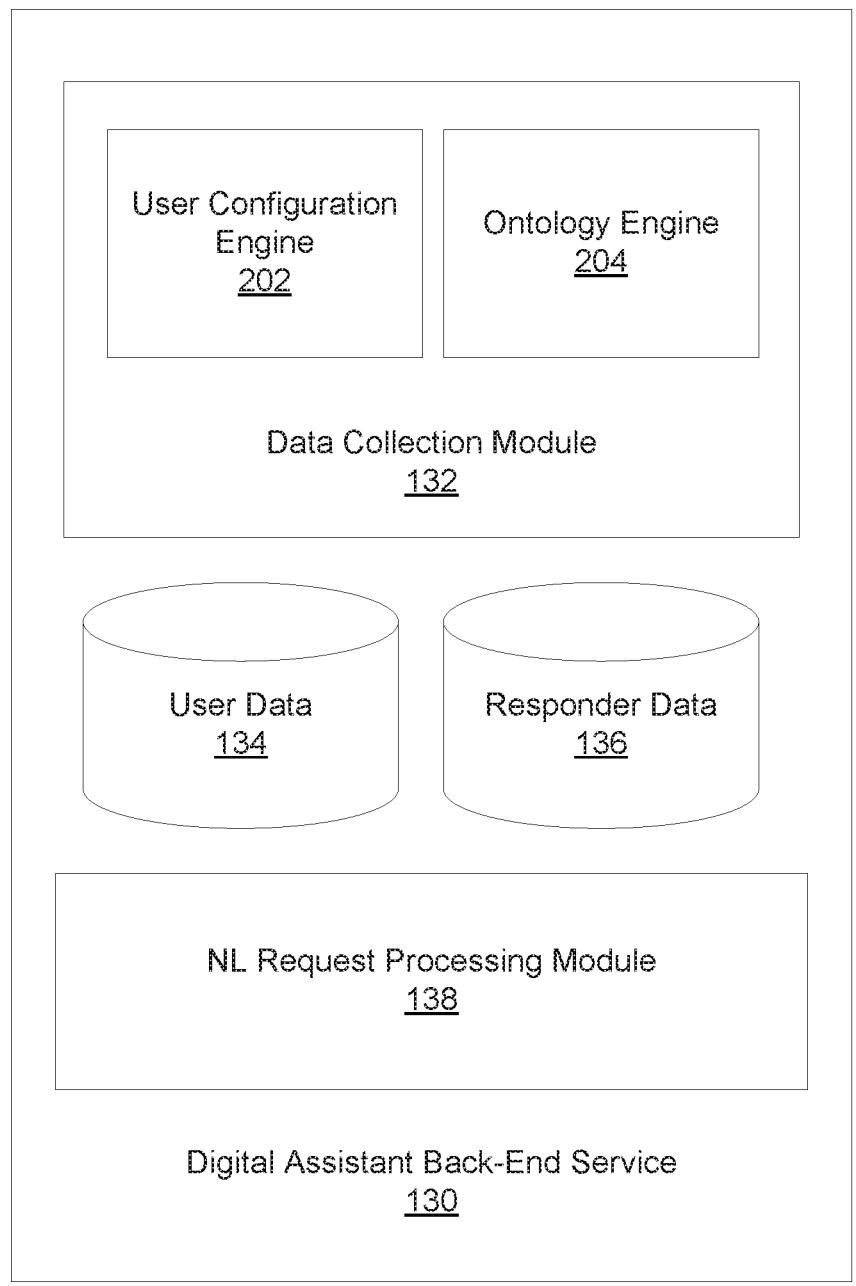
FIG. 2 illustrates a detailed view of the data collection module included in the back-end service of FIG. 1, according to an embodiment.

FIG. 2 illustrates the data collection module 132 included in the back-end service 130 of FIG. 1, according to an embodiment. As discussed above, the data collection module 132 collects information associated with users of the digital assistant 110 and stores the user information in the user data store 134. The data collection module 132 includes a user configuration engine 202 and may include an ontology engine 204.

The user configuration engine 202 is a software module that captures configuration information associated with one or more users of the digital assistant 110. The configuration information associated with one or more users is stored in the user data store 134. The user configuration engine 202 may automatically learn the configuration information associated with a user based on requests received from and/or responses provided to the user. The user configuration engine 202 may also manually receive user configurations from users of the digital assistant 110 via a configuration interface (not shown). User configuration information may include user identity and demographic information, authentication credentials associated with different responders 140 and/or target entries, contacts information, and configuration information that influences how requests are interpreted and how requests are to be processed.

An example of user configuration information is an alias definition that maps an alias to a domain name or other unique identifier that identifies a responder 140 or a target entity. In one embodiment, an alias has a natural language format different from the domain name format of the corresponding domain name. Aliases for domain names allow a user of the digital assistant 110 to assign familiar identifiers to refer to a given entity, a group of entities, a given action, or a given request. In one embodiment, the user configuration engine 202 may automatically determine an alias based on a user's address book information. For example, a name of a person may be an alias for a domain name associated with the person when the domain name is provided in an address book belonging to the user of the digital assistant 110. For instance, the alias "Biff" may be a nickname found in an address book entry that identifies domain name "biffblabbertooth.tld" as a unique identifier associated with "Biff".

In other examples, terms that classify the entities may be used as aliases. For example, configuration information for user "John Doe" may indicate that John Doe's sister is uniquely identified by the domain name "janedeer.tld" and identify her as his sister, thus creating the alias "sister" for the domain name "janedeer.tld". In another example, John Doe may have indicated that certain people found in his address list are cousins, this then being the basis for defining the alias "cousins" to include the entire group of people indicated as cousins.

In another embodiment, the user configuration engine 202 may automatically determine an alias based on well-known or trademarked terms. For instance, the company "Gadgets-N-Widgets Inc." with unique identifier "gadgetsNwidgets.tld" may have trademarked the term "Gadg Widz". The user configuration engine may interact with a service that retrieves trademarked terms associated with a domain name and discover the trademark term "Gadg Widz" and then allow it to be used as an alias for "gadgetsNwidgets.tld". In another embodiment, the user configuration engine 202 may automatically determine an alias based on analyzing past requests and responses to those requests handled by the digital assistant 110. The user configuration engine 202 may determine that a user of the digital assistant 110 always or frequently refers to a given entity using a certain domain name and may configure a more user-friendly name of the entity as an alias for the domain name or an alias of a role associated with the entity. For example, a portion of a domain name may be used as an alias. For instance, the alias "NOAA" may be generated if a user frequently requests for weather updates from "noaa.gov". In some embodiments, a responder 140 may provide suggestions for aliases to be associated with specific entities, such as suggesting the alias "Capital" for "dc.gov" as a responder for requests about government activities.

Another example of a request interpretation configuration is the preferred responder configuration. A preferred responder configuration specifies a preferred responder 140 for fulfilling requests having a given request type, target entity, or an aspect of a target entity. For example, a given responder 140 having a weather information platform may be the preferred responder for weather-related requests. The preferred responder configurations may be automatically determined or may be manually provided by the user of the digital assistant 110.

In some circumstances, a user may "follow" a specific responder 140 or a specific entity. For example, a user may follow a domain name that serves as a unique identifier for a responder 140 or entity. In the case of following a responder 140, "follow" serves as a mechanism for setting a preferred responder configuration. With the follow mechanism, the user configuration engine 202 may receive configurations that are associated with (i) request types that are frequently issued and preferred responders 140 for those request types, (ii) actions that are frequently performed and the preferred responders 140 for those actions, (iii) indication that aliases are to be created for a responder or entity (iv) default target entities for requests and/or responders, (v) the default aspects of followed target entities, (vi) default parameters to apply based on the requesting entity, the request type, the responder, or the target entity, and (vii) indication that the digital assistant 110 should proactively perform processing to pre-generate responses for anticipated future requests related to a followed responder or a followed entity.

When following a specific entity, the user may specify the entity based on any of a number of identifiers or aliases associated with the entity that can be mapped back to a unique identifier for the entity. For instance, the name of a person in the user's address book could be used as an alias. When an entity is followed, a service identified by the unique domain name for the entity may have been configured to identify a responder 140 or group of responders 140 to interact with relative to specific request types that reference the entity. In this case, when the user later issues one of the specific types of requests associated with a followed entity, the service identified by the unique domain name for the entity identifies the relevant responders 140 for the entity so that the request can be routed to one or more of the configured responders 140.

A user may request that digital assistant 110 follow an entity using a command that specifies the unique identifier, such as a domain name, associated with the entity, such as "follow johndoe.tld". The user may also use an alias that the digital assistant 110 and/or the back-end service 130 determine to be associated with the domain name based on user configurations stored in the user data store 134. For instance, the user configuration engine 220 may process a user request to "follow John Doe" by searching the user data store 134 for an address book record for "John Doe", and then after finding the record, determine the domain name associated with "John Doe" based on a domain name specified in the record. The user configuration engine 220 may then add the domain name to user data store 134 and create "John Doe" as an alias for the domain name specified in the record.

In the case of following an entity, the back-end service 130 may optimize requests related to a followed entity in a number of ways. The back-end service 130 may disambiguate aliases based on giving preference to aliases associated with followed entities. For instance, a user may have several acquaintances in their address book with the first name of "John," but may only be following one of the acquaintances relative to a particular request type. For example, the user may be following only one person with the first name "John" relative to "social" requests. This follow configuration is stored in the user data store 134 that links the unique identifying domain name for the followed "John" to social media pages. Based on these configurations, when the back-end service 130 receives a request for a social media update for "John," the back-end service 130 determines that the user is referring to the followed acquaintance "John." The back-end service 130 may use followed entities as defaults in situations where an entity is not specified in a request made to the digital assistant and a determination needs to be made as to which entity is associated with a request. For example, a user may specify that they want to follow business news about two entities, "somecorp.tld" and "anothercorp.tld". The back-end service 130 may then proactively track ongoing activities related to the followed entities or may provide other optimizations and special processing functions related to the followed entities. The activities and other operations may be determined based on links associated with the domain name. Following might also be used to indicate to the back-end service 130 that generalized requests might be converted to multiple specific requests to responders 140 that provide capabilities related to an entity, with the responses from the responders aggregated and then provided to the requestor.

In an example of following a responder 140, a user action may configure the back-end service configuration 130 in the user data store 134 to record that user is following news updates from responders "funkystocks.tld" and "hotmoneytipsnow.tld" as responders for stock tips requests. When the user subsequently requests stock tips, the back-end service 130, based on the configurations stored in the user data store 134, determines that the request is to be fulfilled using the responders "funkystocks.tld" and "hotmoneytipsnow.tld".

In an example of following an entity, a user may follow "John Doe" and "Jane Deer" social media postings. When the user subsequently requests social updates without specifying any entity for which updates are requested, the back-end service 130, based on the configurations stored in the user data store 134, determines that the request is to be fulfilled by providing updates for "John Doe" and "Jane Deer" based on the user having previously followed those entities.

In an example of following being used to generate aggregated responses for generalized requests about an entity, a user may follow "John Doe" on social media sites, "John Doe's" bicycling blog, and news releases about "John Doe" on the website of the company at which "John Doe" is employed. When the user subsequently requests updates about "John Doe", the back-end service 130, based on the configurations stored in the user data store 134, determines that the user is following "John Doe" for multiple request types and multiple responders 140 including the social media sites, the blog website, and the company website. The back-end service 130 requests for updates about "John Doe" from all of the identified responders 140 and receives responses back from the responders 140 and generates an aggregated response that is presented to the user.

A digital assistant 110 may provide other mechanisms for removing ambiguity relative to entities that a request applies to or for populating generated requests with parameter values for parameters values that cannot be explicitly derived from the natural language request a user submitted. In one embodiment, the digital assistant 110 may identify characteristics of a service associated with a unique identifier. For example, a user may follow both "weatherinfo.tld" and "marineweather.tld" as responders for weather information. A digital assistant 110 may identify that "weatherinfor.tld" provides robust weather responses that do not include some information specific to marine weather forecasts, such as wave heights. The digital assistant 110 may also identify that "marineweather.tld" provides less robust weather forecasts, but that do include wave heights. The digital assistant 110 may then disambiguate which of the two followed weather responders to use based on whether or not the user wants a forecast that includes wave heights. Also, in the case where the digital assistant 110 is creating a request for use with responder "marineweather.tld", the digital assistant 110 may include a parameter indicating that wave heights should be included in the response. When generating a request for use with responder "weatherinfo.tld", the digital assistant 110 may determine that using a parameter to request wave heights is not applicable to "weatherinfo.tld" and thus not include a parameter requesting wave heights in the generated request.

To aid in determining responders 140 associated with an entity, a "hub" service identified by a domain name or some other unique identifier associated with the entity may be used to identify the associated responders 140. For instance, user "John Doe" may use domain name "johndoe.tld" as the name of a hub service that identifies a set of social media responders 140 that respond to social media requests about John Doe. A hub configuration function is used to define the responders 140 to use for a particular request type. The hub configuration function may also allow a user to identify the responders 140 for a given entity. Automated mechanisms may also be used to discover and identify the responders 140. For example, an automated tool could check various responders it is aware of to see if one or more of the responders are able to respond to requests about the user and then configure the hub to interact with responders that are able to respond. In some embodiments, a responder may provide a service that allows an automated tool or a digital assistant to retrieve a manifest that lists the various request types that the responder can respond to. The manifest may indicate optional elements or implementation specific details relative to request processing supported by the responder. In some embodiments where request and response are subject to version updating over time as request and response formats evolve, a responder may indicate version information that identifies which specific request and response versions the responder supports.

Configuring a responder 140 on a hub may also include a function for configuring information needed for interacting with the responders 140, such as a user's account information for a social media platform. In some embodiments, hub configuration information may be captured and used by the back-end service 130. In some embodiments, a hub service may provide hub configuration information to the back-end service 130 upon request. In some embodiments, a chain of services may be configured and subsequently interacted with to provide the information a back-end service 130 needs to identify and interact with configured responders.

In an example of using a domain name to identify a service to serve as hub, a user may set up a social medial hub. The user may first purchase a domain name such as "bigleague-dunkmeister.tld" to serve as a unique social media identifier. The user may then set up a webserver to provide hub services for "bigleague-dunkmeister.tld". In this example, the user is a member of the social website "somesocialsite.tld" with user's identity being "dunkmeister" and the user is a member of "someothersocialsite.tld" with user's identity being "bigleague-star". To enable responders 140 interacting with the hub to identify the social sites that the user is a member of and determine the user's identity on those sites, the user may operate a hub configuration function for "bigleague-dunkmeister.tld" to define a link to "somesocialsite.tld" as a social media responder for the user identifier "dunkmeister". The user may also configure a link to identify "someothersocialsite.tld" as a social media responder for the user identifier "bigleague-star". Once configured, a standard service interface provided by the hub "bigleague-dunkmeister.tld" would respond to requests for the user's social identities with a response that identifies the two social media sites and the corresponding user identifiers. For example, the standard service might be accessible via the HTTP REST endpoint "https://bigleague-dunkmeister.tld/social/membership." Requests to this endpoint may return the following JSON response:

```
{
    "SiteMembership": [
        {"Site": "somesocialsite.tld", ID: "dunkmeister"},
        {"Site": "someothersocialsite.tld", "ID": "bigleague-star"}
    ]
}
```

To support creation and configuration of hubs and data associated with hubs, a hub application may be provided by a digital assistant 110 or in association with a digital assistant 110. Capabilities provided by a hub application could include hub creation, identification of hubs the digital assistant 110 should associate with a user, creation and updating of hub configuration data, and importing data from hubs into configuration data managed by the digital assistant. To support creation of a hub, a digital assistant 110 may detect that a user has not yet identified a hub to be associated with the user and then allow the user to invoke a hub application. A digital assistant 110 may also provide a hub application to a user in response to a request from the user. A hub application may interact with a user to determine if the user has an existing hub they would like to use with the digital assistant and have associated with the user. A hub application may also facilitate creation of a new hub to associate with the user. In the case where a user is identifying an existing hub to associate with the user, a hub application may update digital assistant configuration data associated with the user to indicate an association between the user and the unique identifier for the hub. In the case where a user is creating a hub, a hub application may direct the user to a provider or service that specializes in registering unique identifiers useable with a digital assistant, such as a domain name registrar when domain names are used as the unique identifiers. A hub application may then update digital assistant configuration data associated with the user to indicate the user is associated with the unique identifier for the hub.

Creation and updating of hub configuration data could be performed through a number of mechanisms. In one mechanism, a user interacts with a hub application to explicitly define hub configuration data. In another mechanism, hub configuration data may be created or updated by importing data already associated with a user and where the data is provided by some other service. For example, imported data could consist of existing user configuration data managed by the digital assistant and which is provided to a hub application by the digital assistant. For example, a user may have previously provided a digital assistant with social configuration data that identifies that the user is a member of two social sites, "somesocialsite.tld" and "anothersocialsite.tld" and also identifies the user's user name on each of the two social sites. Later, when configuring a hub associated with the user, the digital assistant's social configuration data for the user could be imported into the hub's configuration data. In another example, data to be imported could be provided by services explicitly identified by the user or identified by configuration data managed by the digital assistant. For example, a user could interactively identify social sites they are a member of and then data from the identified social sites could be imported into a hub's configuration data. Once configuration data is imported into a hub, the configuration data is discoverable for use by other digital assistant users according to methods described herein.

A digital assistant 110 may also provide a capability for importing hub configuration data and configuration data from external services into the user configuration data that is managed by the digital assistant 110. In this case, the digital assistant 110 or an application associated with the digital assistant 110 would interact with services on a hub or other external services associated with the user to retrieve configuration data from the services. This data would then serve as the source for data that is created or updated by the digital assistant 110 and associated with the user. For example, a user may have previously configured a hub with data for their social configuration. Later, the user may begin using a new digital assistant 110 and wish to have their social configuration on the hub reflected in the user's configuration data that is managed by the digital assistant 110. In this case, the user could provide the identity of the hub to the digital assistant 110 and the digital assistant 110 could then use a service interface provided by the hub to retrieve the user's social configuration data and then use that data in to populate the user's social configuration within the configuration data managed by the digital assistant 110.

While the description and examples of a hub application and digital assistant hub configuration data import functions described here-in focus on a user performing actions on their own behalf, in various embodiments other entities may perform these functions on behalf of a user. For example, a person with administrative power over a digital assistant may use a hub application on behalf of many users. In another example, a hub application may be periodically invoked by the provider of a digital assistant to perform hub configuration data import and export for a group of digital assistant users.

The ontology engine 204 is a software module that provides ontology data to the back-end service and may capture configuration information associated with ontology defined categorizations of the responders 140. The configuration information associated with the responders 140 may be stored in the responder data store 136. An ontology associated with a responder 140 defines the keywords to be used for request types to be processed by the responder 140, target entities that the responder 140 provides information regarding, aspects of target entities, request parameter types, and the allowable values for request parameters. An ontology may also define the elements of responses received from a responder 140. In some embodiments, a given responder 140 may be associated with multiple ontologies. Ontologies provide a basis for standardizing keywords used for request types, entity aspects, and request parameters across multiple responders 140. In some embodiments, ontologies may be provided by external services (not shown). In some embodiments, the ontology engine 204 may dynamically determine ontology configuration information based on information retrieved from an external ontology service. In the cases where an external ontology service is accessed by the ontology engine 204, the external ontology service provides the benefit of ensuring consistency in ontology data and configuration. Compliance with ontologies by digital assistants, responders, and other services enables interoperability and provides consistency in both syntax and semantics for digital assistant request processing.

In some embodiments, a standard service interface for a responder 140 may be derived from an ontology. For example, in the case where weather responder service "alltheweather.tld" is compliant with a HTTP REST service interface derived from the weather class of an ontology, a URI in the format of a URL endpoint "http://alltheweather.tld/service/weather" might be used for responding to weather requests and the allowable query parameters which could be included in the URL for weather requests and the allowable response values might be based on the attributes of the weather class: "location", "date", "time", "forecast", "temperature", "wind_speed", "wind_direction", "relative_humidity", "precipitation-type", "precipitation-rate", "barometric-pressure", "requestkeys:location,date,time". In a further example of how a request might be translated to a HTTP request to a REST service based on the weather, the user request "ask alltheweather.tld for the weather in Albany, N.Y." might be translated into request consisting of a URI as the following URL to invoke a response from responder "alltheweather.tld": "http://alltheweather.tld/service/weather?location=albany_new_york."

In another embodiment, the configuration information associated with a responder 140 is handler information specifying one or more access points for accessing the responder 140. The handler information may identify a software handler included in an application programming interface or may be a web-based interface. The access points may be determined based on the ontologies associated with the responder 140 or a URL template associated with a request type with which the responder 140 is associated.

Figure 3:
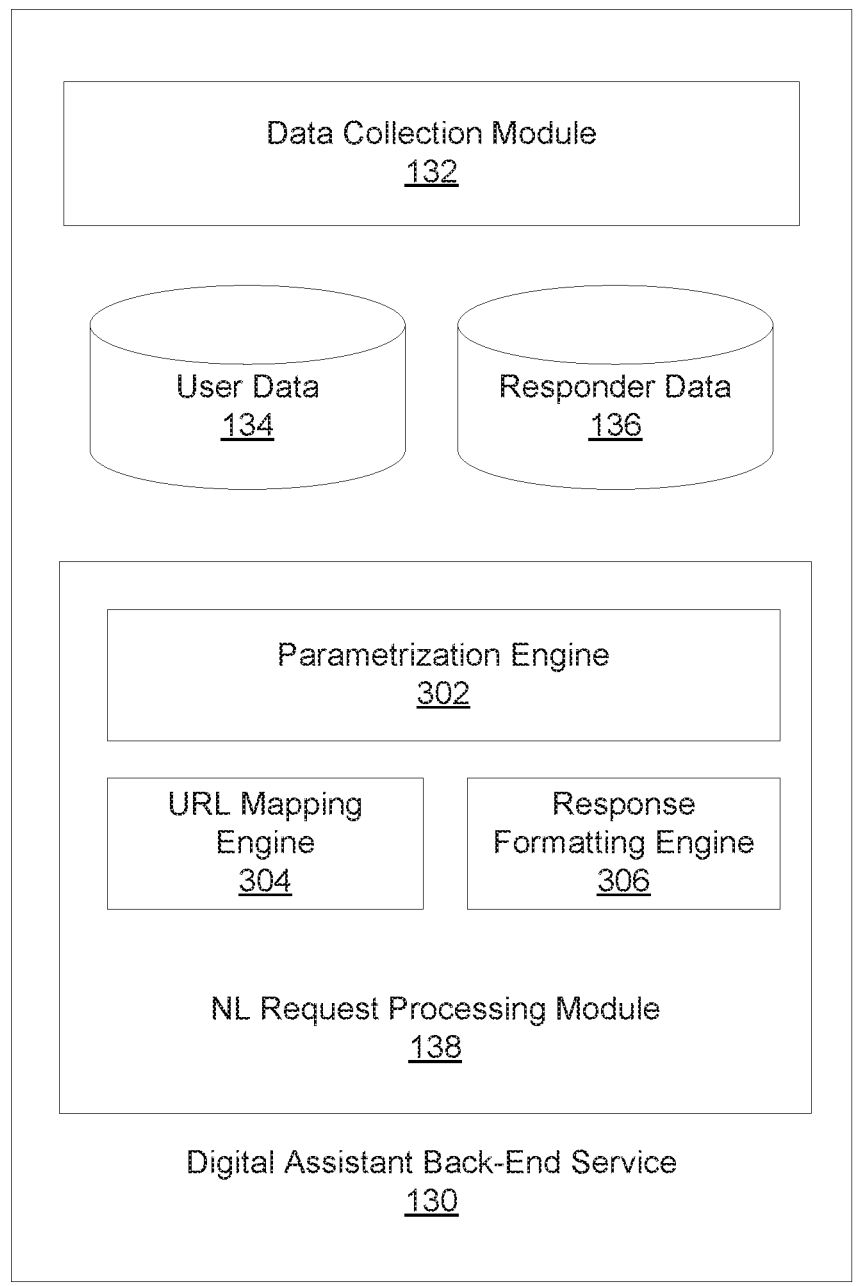
FIG. 3 illustrates a detailed view of the natural language request processing module included in the back-end service of FIG. 1, according to an embodiment.

FIG. 3 illustrates a detailed view of the NL request processing module 138 included in the back-end service 130 of FIG. 1, according to an embodiment. As discussed above, the NL request processing module 138 receives natural language requests captured by the digital assistant 110, determines one or more parameters associated with the request, and generates a responder request based on the parameters to be provided to the relevant responders 140. The NL request processing module 138 may include a parameterization engine 302, a uniform resource locator (URL) mapping engine 304, and a response formatting engine 306.

The parameterization engine 302 receives a natural language request captured by the digital assistant 110 and parses the request in order to extract and/or semantically infer parameters associated with the natural language request. The parameterization engine 302 generates a parameterized representation of the natural language request based on the extracted or inferred parameters. As discussed above, the parameters associated with a natural language request include, but are not limited to, (i) identity of the user who spoke the request, (ii) the identity of the device owner, (iii) type of request, e.g., information retrieval generally, information retrieval for specific types of content, or performing an action external or internal to an environment in which the digital assistant 110 is placed, (iv) the identities of one or more responders 140 that are to be interacted with to fulfill the request, (v) identities of one or more target entities and aspects of those target entities to which the request applies, and (vi) how to programmatically handle the request.

In some cases, parameters in a parameterized representation of the natural language request may be translated by the parameterization engine 302 to a canonical form or a unique identifier. In some embodiments, the canonical form or unique identifier for a parameter may be a domain name. The parameters may be determined by a number of means such as: being extracted directly from the request; based on user configuration and/or responder configuration; by using ontologies that define request elements; by inference based on the current location of the digital assistant 110; and by associations and inferences based on past interactions with the digital assistant 110. In one embodiment, the parameterization engine 302 parses the request and identifies strings of words that satisfy the domain name format, i.e., labels joined by dots. These are extracted as entity domain names. Based on the determined request type and request parameters, a semantic understanding of the request is formed. The parameterization engine 302 can then determine whether an extracted entity domain name identifies a responder 140, a requesting user, or a target entity about which information is being requested or provided. For example, for the natural language request, "ask bigleague.tld for Baltimore Dunkers 2017 schedule," the parameterization engine identifies the request type as an "inquiry" request for the attribute "schedule" from a specified responder (bigleague.tld) for a specified entity (Baltimore Dunkers).

The parameterization engine 302 may use a variety of algorithms to determine constituent elements in a request and to map them to parameters including: position within the request; matching of the request against request templates; parsing the request according to a request "compiler" that is informed by a formalized request grammar; artificial intelligence mechanisms such as neural networks. For example, a location algorithm may determine that the term "bigleague.tld" is in a spot within the natural language request where a responder is expected to be specified and then determines "bigleague.tld" is an entity domain name identifying a responder 140. In another example, a natural language request grammar may be specified in Backus-Naur form (BNF). During request processing, the natural language request is parsed using a request compiler for the applicable natural language request grammar. The compiler first tokenizes the request into its constituent elements, determines if the request is in a valid format relative to the grammar, and generates a parameterized representation of the request based on the tokens and token types found during tokenization of the natural language request. In some cases, the parameterization engine 302 does not find elements in a received natural language request from which to derive some of the elements in a parameterized request. In this case, default values may be used for the elements that could not be derived from the request. The values for the default elements may be determined by a number of mechanisms. In one example, default values may be based on configuration data that was specified to the user configuration engine 202. In another example, default values may be based on values that have been frequently specified by the user in requests of the identified request type. In another example, an artificial intelligence capability may determine based on a series of requests from a particular user that the user is currently performing a particular type of task involving a particular set of entities and use this knowledge to identify default values.

For words or strings of words that do not satisfy the domain name format, the parameterization engine 302 may determine parameters associated with those words based on the user configuration information stored in the user data store 134, ontology data and ontology configuration provided by the ontology engine 204, the responder configuration information stored in the responder data store 136, and/or semantic inference techniques. For example, the parameterization engine 302 compares a word or a string of words against aliases to determines whether any of the words matches a previously determined alias or a dynamically identified alias. If a match is found, then a parameter associated with the request may be determined based on an entity's unique identifier, for example, a domain name that has been associated with the alias. As another example, the parameterization engine 302 compares a word or a string of words against target entities or related keywords specified in various ontologies. If any of the words matches a target entity handled by the responders 140 associated with the ontologies, then a parameter associated with the request may be based on the unique identifier associated with the entity, such as a domain name associated with the target entity. Further, if any of the words matches a keyword in an ontology, then the responder parameter associated with the request is set as the responder 140 associated with the request type associated with the keyword and ontology class it identifies.

In one embodiment, the parameterization engine 302, using configuration information associated with an ontology defined categorization of responders 140, may identify the responder 140 to be used for a request. The ontology engine 204 provides the ontology elements associated with the request and responder to enable syntax checking of the user's request by the parameterization engine 302 to compare keywords in the request and the structure of the request with the ontology applicable to the request. After determining that a request is conformant with the ontology and the ontology-defined responder capability, the parameterization engine 302 creates a parametrization representation derived from the user's request in a format suitable for interacting with the responder. For example, an ontology applied to processing a "weather" request might define a "weather" class identified by the keyword "weather" with attributes "location", "date", "time", "forecast", "temperature", "wind speed", "wind direction", "relative humidity", "precipitation type", "precipitation rate" and "barometric pressure." On receiving a request for weather information, the NL request processing module 138 compares the request with the ontology to determine if elements of the weather request conform to the ontology. The NL request processing module 138 also determines whether identified responder 140 supports weather requests and may also determine whether or not the responder supports the requested weather attributes. Similarly, a responder 140 receiving a weather request could use similar ontology-related configuration and processing functions determine if the request is compliant with the ontology definition of the weather class and weather attributes supported by the responder.

The URL mapping engine 304 generates one or more responder requests as URLs based on the parametrized representation generated by the parameterization engine 302. In one embodiment, the URL mapping engine 304 determines the syntax and elements of a generated URL based on the elements of the parameterized request and a template URL that applies to the type of request being generated. Other methods of generating a URL based on the parameterized request may be used, such as using the parameterized request as an input to a finite state machine to generate URLs. In one embodiment, for each relevant responder 140, the URL mapping engine 304 maps the parametrized representation onto a URL syntax based on the ontology associated with the relevant responder 140. The URL syntax includes sub-domain names, path segments, hash tags, query keywords, and search values. The URL mapping engine 304 may determine, based on the applicable ontology, the values that need to be provided in the URL and fills those values based on the parametrized representation. In other embodiments, an alternate mapping engine may be used to produce requests that in a format appropriate for the protocol that is used in communicating request data to responders.

The URL mapping engine 304 transmits a request to each relevant responder 140 based on the URL generated for the corresponding URL syntax applicable to each relevant responder. The request may be transmitted based on the handler information provided by the relevant responder 140. For example, the request may be transmitted to a software handler included in an application programming interface (API) provided by the responder 140.

The response formatting engine 306 receives responses or response data based on responses that were returned by responders 140 to which requests were transmitted. In one embodiment, a response includes information requested about a target entity specified by the request. The response formatting engine 306 generates response representations based on the received responses or response data in a format that reflects the content of received responses and is suitable for processing and presentation by the digital assistant 110. The response formatting engine 306 may generate the response representations based on ontology information and ontology configuration associated with the responders 140 from which the corresponding responses were received. The response formatting engine 306 transmits the response representations to the digital assistant 110 for delivery in response to the natural language request. The response representations may be delivered over audio output for digital assistants that are voice assistants. In other embodiments where a digital assistant is a chatbot, the response representations may be delivered as text displayed on a video monitor. In one embodiment, responses from different responders 140 are aggregated. In some cases, a response or response data may be used for additional purposes, such as being stored in the responder data store 136 and subsequently being used to influence processing by the NL request processing module 138.

Figure 4:
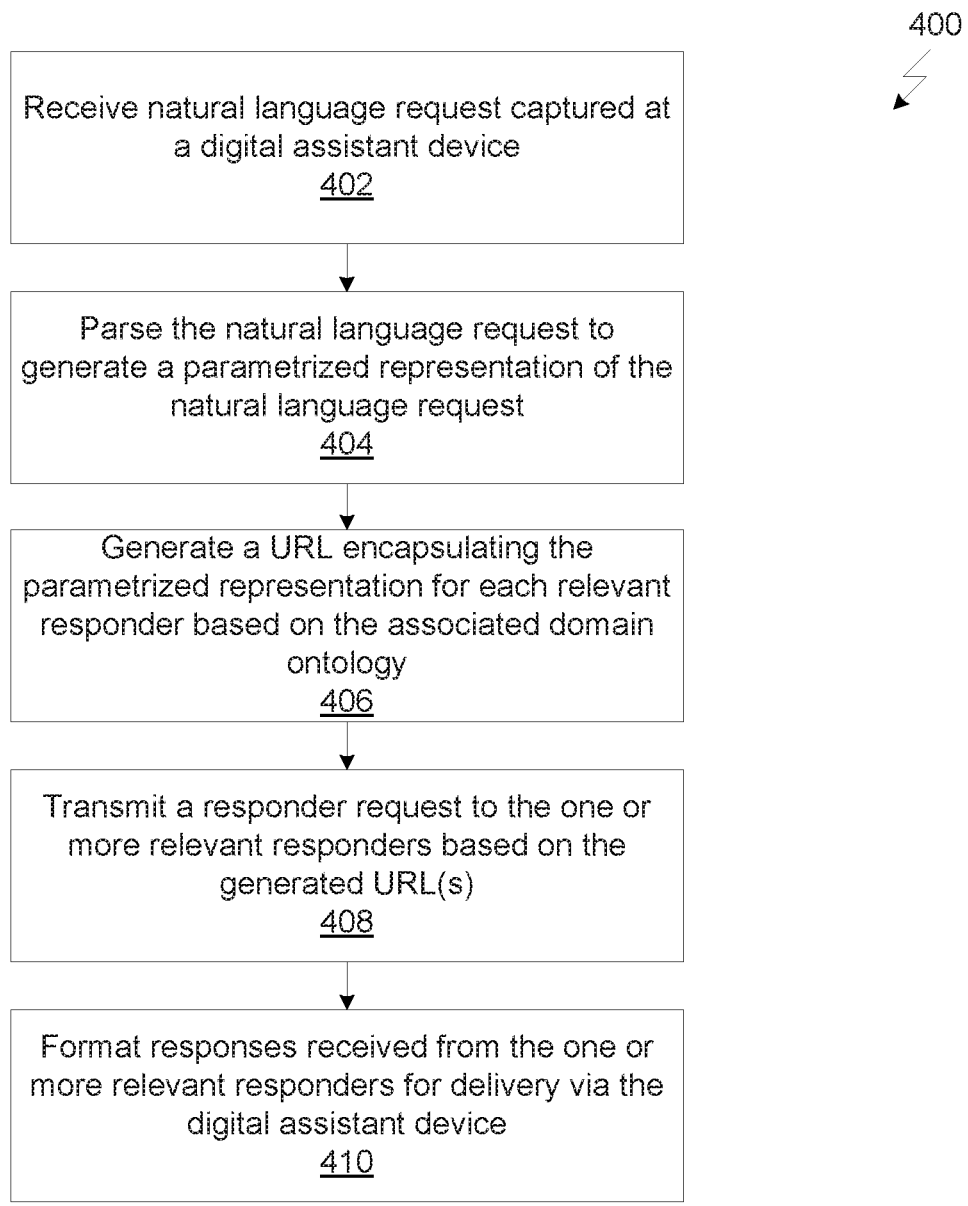
FIG. 4 is a flow diagram of method steps for processing a natural language request captured by a digital assistant, according to an embodiment.

FIG. 4 is a flow diagram of method steps for processing a natural language request captured by a digital assistant, according to an embodiment. Although the method steps are described with reference to the systems of FIGS. 1-3, persons skilled in the art will understand that any system configured to implement the method steps, in any order, falls within the scope of the present invention.

As shown, a method 400 begins at step 402, where the NL request processing module 138 receives a natural language request captured at the digital assistant 110. In the case where a digital assistant is a voice assistant, the natural language request is typically captured over audio and specifies information to be retrieved or an action to be performed in association with a target entity.

At step 404, the NL request processing module 138 parses the natural language request to generate a parameterized representation of the natural language request. The parameterized representation includes unique identifiers, for example, domain names associated with at least one responder. The parameterized representation may also include unique identifiers as domain names associated with one or more target entities. The unique identifiers may be embedded in the natural language request or may be semantically inferred based on the user configuration and/or the responder information.

Below are some examples of parametrized representations of natural language requests as processed by the parameterization engine 302 according to the process 400 depicted in FIG. 4. As can be seen from the examples below, the parameters associated with a natural language request may be included in the request or may be semantically inferred by the back-end service 130.

Example A: The User "Andy" issues the natural language request "ask bigleague.tld for Baltimore Dunkers 2017 schedule." The parameterized representation of the request is determined to be: user→"Andy", handler→"askHandler", request type→"inquiry", responder→"bigleague.tld", target entity→"Baltimore Dunkers", aspect→"schedule", parameter→"year=2017."

Example B: The User "Andy" issues the natural language request "what is the Baltimore Dunkers 2017 schedule." The parameterized representation of the request is determined to be: user→"Andy", handler→semantically determined to be "askHandler", request type→"inquiry", responder→semantically determined to require a responder and since one was not specified, a default responder "bigleague.tld" is used, target entity→"Baltimore Dunkers", aspect→"schedule", parameter→"year=2017."

Example C: The User "Andy" issues the natural language request "what is tomorrow's weather forecast." The parameterized representation of the request is: user→Andy, handler→semantically determined to be "inquiry router", request type→"inquiry", responder→semantically determined to require a responder and since one was not specified, a default responder "weather.tld" is used, target entity→defaults to user's current location "Reston Virginia", aspect→"weather", parameter→"date=tomorrow."

At step 406, for each relevant responder 140, the URL mapping engine 304 maps the parameterized representation onto a URL syntax based on the ontology associated with the relevant responder 140. The URL syntax includes sub-domain names, path segments, hash tags, query keywords, and search values. In operation, the URL mapping engine 304 determines, based on the domain ontology, the values that need to be provided in the URL and fills those values based on the parameterized representation. For example, a parameterized representation of the natural language request "ask funkystocks.tld for lunarvacations.tld current stock price" is user→"Andy", handler→"retrieveEndpoint", request type→"inquiry", responder→"funkystocks.tld", target entity→"lunarvacations.tld", aspect→"aspect→current stock price" The URL generated by the URL mapping engine 304 at step 406 is "https://funkystocks.tld/retrieve?entity='lunarvacations.tld'&aspect='current stock price'". The domain name "funkystocks.tld" uniquely identifies the responder 140 in the parameterized representation of the natural language request, and the domain name "lunarvacations.tld" uniquely identifies the target entity in the parameterized representation. The aspect "current stock price" is defined by the ontology used by the responder for the "retrieve" class and the mechanism for mapping those aspects onto the URL syntax is also informed by the ontology.

At step 408, The URL mapping engine 304 transmits a request to each relevant responder 140 based on the URLs generated for each responder 140. The request may be transmitted based on the handler information provided for the relevant responder 140. For example, the request may be transmitted to a software handler included in an application programming interface (API) provided by the responder 140.

At 410, the response formatting engine 306 receives responses from responders 140 to which requests were transmitted. In one embodiment, a response includes information requested about a target entity specified by the request. The response formatting engine 306 translates received responses to a format suitable for use by the digital assistant and transmits the responses to the digital assistant 110 to present as responses to the original natural language request. The responses may be delivered over audio output. In one embodiment, responses from different responders 140 are aggregated. In one embodiment, the response formatting engine 306 may format the responses to optimize the delivery of those responses over audio output.

Figure 5:
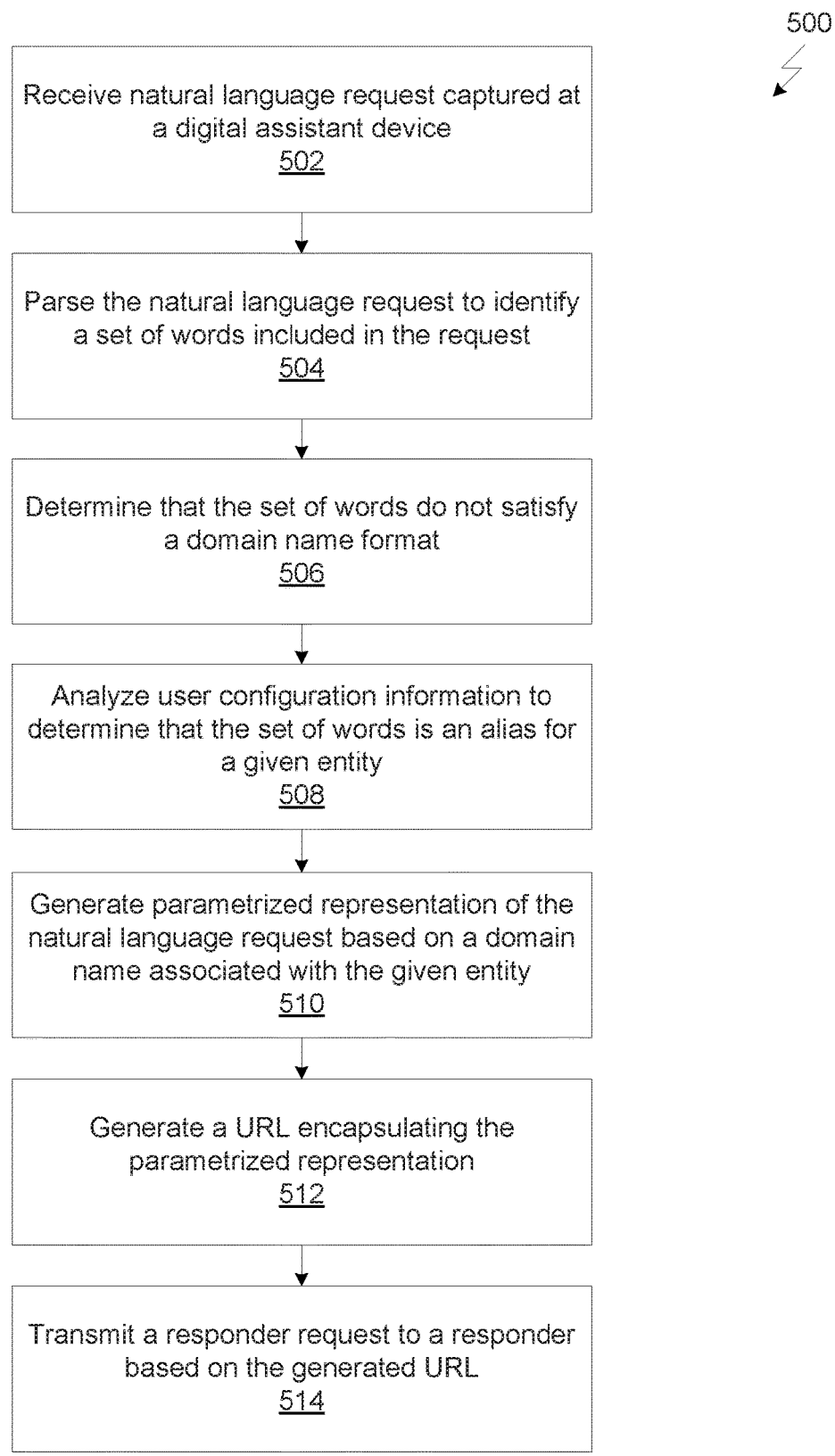
FIG. 5 is a flow diagram of method steps for processing a natural language request including an alias, according to an embodiment.

FIG. 5 is a flow diagram of method steps for processing a natural language request including an alias, according to an embodiment. Although the method steps are described with reference to the systems of FIGS. 1-3, persons skilled in the art will understand that any system configured to implement the method steps, in any order, falls within the scope of the present invention.

As shown, a method 500 begins at step 502, where the NL request processing module 138 receives a natural language request captured at the digital assistant 110. In an embodiment where the digital assistant is a voice assistant, the natural language request is typically captured over audio and specifies information to be retrieved or an action to be performed in association with a target entity.

At step 504, the NL request processing module 138 parses the natural language request to identify a set of words included in the request. At step 506, the NL request processing module 138 determines that the set of words does not satisfy the format that the digital assistant uses for unique identifiers, for example the domain name format. At step 508, the NL request processing module 138 analyzes user configuration information to determine that the set of words is an alias for a given entity and is mapped to a unique identifier associated with that entity. If the set of words does satisfy the format that the digital assistant uses for unique identifiers, then the set of words is not an alias and, therefore, the NL request processing module 138 processes the request without the translation from the alias to the unique identifier performed at step 508.

At step 510, the NL request processing module 128 generates a parameterized representation of the natural language request based on the unique identifier mapped to the alias. At step 512, the NL request processing module 138, generates a request, for example a URL encapsulating the parameterized representation based on a URL syntax associated with an ontology associated with a relevant responder 140. At step 514, the NL request processing module 138 transmits a responder request to the relevant responder 140 based on the generated URL.

In sum, a digital assistant request is a natural language input provided to a digital assistant so as to instigate an interaction with responders who can fulfill the request. A digital assistant interface accepts natural language inputs and in turn provides responses in a human consumable format. To provide precise and complete responses to the natural language request, a unique-name based framework is used as described here-in. The unique-name based framework uses domain names or some other set of unique identifiers as identifiers for request types, requesting entities, responders, and target entities. Further, the framework enables interpreting natural language requests according to ontologies associated with different responders and request types. An ontology operates as an enhanced keyword dictionary for one or more responders and optionally defines the keywords and parameter types to be used for request types and request parameters. The domain-name based framework thus enables the digital assistant to interact with any responder that supports an ontology for a desired request type and to generate precise and complete responses to natural language based requests.

1. In some embodiments, a method comprises identifying a set of spoken words included in a first natural language request received at a digital assistant, determining that the set of spoken words matches an alias for an entity, wherein the entity is associated with a unique entity identifier having a first format, and the alias is associated with a format that is different than the first format, identifying a responder based on the set of spoken words, and transmitting a request to an identified responder to obtain information associated with the entity.

2. The method of clause 1, further comprising determining that the alias maps to the entity identifier based on a configurable mapping between the alias and the entity identifier.

3. The method of clauses 1 or 2, wherein the configurable mapping is defined by an issuer of the natural language request.

4. The method of clauses 1-3, wherein the alias comprises a keyword identifying the entity, and the configurable mapping maps the keyword to the entity identifier.

5. The method of clauses 1-4, wherein the alias comprises an identifier included in a contact directory, and the configurable mapping maps the identifier to the entity identifier that is stored in association with the identifier in a contact directory.

6. The method of clauses 1-5, further comprising determining the alias based on one or more data sources that store associations between the entity identifier and other identifiers and labels associated with the entity.

7. The method of clauses 1-6, further comprising determining the alias is based on analyzing of previously issued natural language requests that included the entity identifier.

8. The method of clauses 1-7, wherein the alias comprises a portion of the entity identifier.

9. The method of clauses 1-8, wherein the alias identifies a class of entities to which the entity belongs.

10. The method of clauses 1-9, wherein the entity identifier comprises an entity domain name and the first format comprises a domain name format.

11. In some embodiments, a computer readable medium stores instructions that, when executed by a processor, cause the processor to process natural language requests, by performing the steps of identifying a set of spoken words included in a first natural language request received at a digital assistant, determining that the set of spoken words matches an alias for an entity, wherein the entity is associated with a unique entity identifier having a first format, and the alias is associated with a format that is different than the first format, identifying a responder based on the set of spoken words, and transmitting a request to an identified responder to obtain information associated with the entity.

12. The computer readable medium of clause 11, further comprising determining that the alias maps to the entity identifier based on a configurable mapping between the alias and the entity identifier.

13. The computer readable medium of clauses 11 or 12, wherein the configurable mapping is defined by an issuer of the natural language request.

14. The computer readable medium of clauses 11-13, wherein the alias comprises a keyword identifying the entity, and the configurable mapping maps the keyword to the entity identifier.

15. The computer readable medium of clauses 11-14, wherein the alias comprises an identifier included in a contact directory, and the configurable mapping maps the identifier to the entity identifier that is stored in association with the identifier in a contact directory.

16. The computer readable medium of clauses 11-15, further comprising determining the alias based on one or more data sources that store associations between the entity identifier and other identifiers and labels associated with the entity.

17. The computer readable medium of clauses 11-16, further comprising determining the alias is based on analyzing of previously issued natural language requests that included the entity identifier.

18. The computer readable medium of clauses 11-17, wherein the alias comprises a portion of the entity identifier.

19. The computer readable medium of clauses 11-18, wherein the entity identifier comprises an entity domain name and the first format comprises a domain name format.

20. In some embodiments, a system comprises a memory storing instructions, and a processor executing the instructions to perform the steps of identifying a set of spoken words included in a first natural language request received at a digital assistant, determining that the set of spoken words matches an alias for an entity, wherein the entity is associated with a unique entity identifier having a first format, and the alias is associated with a format that is different than the first format, identifying a responder based on the set of spoken words, and transmitting a request to an identified responder to obtain information associated with the entity.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing natural language requests, the method comprising:
   identifying a set of words included in a first natural language request received at a digital assistant;
   determining that at least one word in the set of words comprises an alias associated with a unique entity identifier of an entity;
   identifying, based on the set of words, a responder;
   transforming the first natural language request into a request related to the entity, wherein the request comprises a uniform resource locator (URL) request that includes one or more words based on the first natural language request; and
   transmitting the transformed request including the URL request to the identified responder.

2. The method of claim 1, wherein determining that the at least one word in the set of words comprises an alias comprises comparing the at least one word with a configurable mapping between the alias and the unique entity identifier.

3. The method of claim 2, wherein the configurable mapping is included in an alias definition stored in memory, and wherein determining that the at least one word in the set of words comprises an alias comprises retrieving the alias definition from memory.

4. The method of claim 2, wherein the configurable mapping is modified by an issuer of the first natural language request.

5. The method of claim 1, further comprising:
receiving, from one or more data sources, associations between the unique entity identifier and other identifiers associated with the entity;
selecting, from the other identifiers associated with the entity, a first selection; and
defining the first selection as the alias.

6. The method of claim 1, further comprising analyzing one or more previously-issued natural language requests or one or more previously-received responses to one or more previously-issued natural language requests to determine the alias.

7. The method of claim 1, further comprising analyzing one or more well-known terms to determine the alias.

8. The method of claim 1, further comprising analyzing an address book to determine the alias.

9. The method of claim 8, wherein the alias comprises a contact identifier included in the address book.

10. The method of claim 1, wherein the alias comprises a keyword identifying the entity.

11. The method of claim 1, further comprising analyzing one or more entities being followed to determine the alias.

12. The method of claim 1, wherein determining that at least one word in the set of words comprises an alias comprises analyzing one or more previously-issued natural language requests that identifies the unique entity identifier.

13. The method of claim 1, wherein the alias comprises a portion of the unique entity identifier.

14. The method of claim 1, wherein the alias identifies a class of entities to which the entity belongs.

15. The method of claim 1, wherein the unique entity identifier comprises an entity domain name in a domain name format.

16. The method of claim 1, wherein the unique entity identifier has a first format and the alias is associated with a format that is different than the first format.

17. A computer-implemented method for processing natural language requests, the method comprising:
identifying a set of words included in a first natural language request received at a digital assistant;
determining, based on an address book of a given user, that the set of words includes one or more words that match an alias mapped to a unique entity identifier, wherein the unique entity identifier is associated with an entity;
identifying, based on the set of words, a responder;
transforming the first natural language request into a request related to the entity, wherein the request comprises a uniform resource locator (URL) request that includes one or more words based on the first natural language request; and
transmitting the transformed request including the URL request to the identified responder.

18. A computer-implemented method for configuring a digital assistant, the method comprising:
determining an identifier associated with an entity to be followed;
generating a follow configuration based on the identifier, wherein the follow configuration causes the digital assistant to process one or more natural language requests associated with the identifier with one or more configured processing operations;
receiving a natural language request associated with the entity;
identifying a responder based on the follow configuration;
transforming the natural language request into a request related to the entity, wherein the request comprises a uniform resource locator (URL) request that includes one or more words based on the natural language request; and
transmitting the transformed request including the URL request to the identified responder.

19. The computer-implemented method of claim 18, wherein the identifier comprises a domain name.

20. A computer-implemented method for processing natural language requests, the method comprising:
determining that a first natural language request received at a digital assistant is associated with a follow configuration configured by a user configuration engine of the digital assistant,
identifying, based on the follow configuration, one or more entity identifiers associated with the first natural language request;
identifying a set of responders based on the first natural language request;
transforming the first natural language request into one or more requests where the transformation is informed by the follow configuration, wherein at least one of the requests comprises a uniform resource locator (URL) request that includes one or more words based on the first natural language request; and
transmitting, to at least one of the identified responders in the set of responders, the one or more requests, including the URL request, related to satisfying the first natural language request; and
providing a response to the natural language request based on responses to the one or more requests to the at least one of the identified responders.

* * * * *